(12) United States Patent
Olivier

(10) Patent No.: US 6,947,449 B2
(45) Date of Patent: Sep. 20, 2005

(54) APPARATUS, AND ASSOCIATED METHOD, FOR COMMUNICATION SYSTEM EXHIBITING TIME-VARYING COMMUNICATION CONDITIONS

(75) Inventor: Jan Olivier, Highland Village, TX (US)

(73) Assignee: Nokia Corporation, Espoo (FI)

( * ) Notice: Subject to any disclaimer, the term of this patent is extended or adjusted under 35 U.S.C. 154(b) by 7 days.

(21) Appl. No.: 10/600,993

(22) Filed: Jun. 20, 2003

(65) Prior Publication Data

US 2004/0258095 A1 Dec. 23, 2004

(51) Int. Cl.$^7$ ................................................. H04J 1/02
(52) U.S. Cl. ........................................................ 370/497
(58) Field of Search ................................. 370/495–497, 370/307, 484, 343, 208–210, 503, 529, 342, 335, 318; 375/259, 295, 219–222, 315–317, 341–347, 130, 144, 325, 316, 230, 240.22; 381/312–316; 455/34.1; 382/232, 254, 282; 329/406.14; 342/378

(56) References Cited

U.S. PATENT DOCUMENTS 5,323,391 A * 6/1994 Harrison ..................... 370/210
6,091,361 A * 7/2000 Davis et al. ................. 342/378
6,154,484 A * 11/2000 Lee et al. .................... 375/130
6,606,391 B2 * 8/2003 Brennan et al. ............. 381/316
6,661,895 B1 * 12/2003 Wong et al. ............ 378/406.14

* cited by examiner

Primary Examiner—Chi Pham
Assistant Examiner—Prenell Jones
(74) Attorney, Agent, or Firm—Federico Fraccaroli

(57) ABSTRACT

Apparatus, and an associated method, for communicating data pursuant to a frequency division multiplexing scheme that takes into account channel conditions on the communication channel upon which the data is communicated. Sub-bands are defined in which adjacent ones of the sub-bands overlap upon one another. When data parts of data communicated upon separate ones of the sub-bands are received at a receiving station, each sub-band is filtered by a first filter to pass signal parts within frequencies within each of the first sub-bands. Over sampling is performed upon each of the past signal parts at the separate sub-bands to frequency-shift interfering component parts thereof. Then, additional band pass filtering is performed to reject the interfering signal component portions. Subsequent processing is thereafter performed upon the data components.

20 Claims, 5 Drawing Sheets

APPARATUS, AND ASSOCIATED METHOD, FOR COMMUNICATION SYSTEM EXHIBITING TIME-VARYING COMMUNICATION CONDITIONS

The present invention relates generally to a manner by which to communicate data in a communication system that exhibits time-varying communication conditions, such as fading. More particularly, the present invention relates to apparatus, and an associated method, by which to facilitate communications in the communication system through the use of FDM (Frequency Division Multiplexing) techniques while also mitigating effects of fading, or other time-variant conditions.

Improved communication qualities in mobile communications, such as cellular communications, effectuated in moving vehicles, are possible. Frequency sub-bands are utilized that partially overlap in frequency, obviating the need for guard bands. Data parts are communicated on different ones of the frequency sub-bands. Time-domain, channel tracking is utilized, thereby permitting time-varying changes in communication conditions to be mitigated. Sub-band interference, due to the overlapping sub-bands is rejected through the use of advanced processing techniques at the receiving station to place the data-parts transmitted on the sub-bands in orthogonality with one another. Fourier Transformer techniques are then able to be utilized both in the sending, and in the recovery of the informational content, of the data.

BACKGROUND OF THE INVENTION

Communication of data is an endemic part of modern society. A communication system is deployed, and used, by which to communicate data. In a communication system, the data is communicated between a sending station, at which the data is sourced, and a receiving station, at which the data is terminated. The sending and receiving stations are connected together by way of a communication channel, and the data that is communicated therebetween is communicated upon the communication channel.

If necessary, the data, prior to its communication from the sending station is converted into a form to permit its communication upon the communication channel. When the data is communicated upon the communication channel, the data is delivered to the receiving station. And, once delivered at the receiving station, the informational content of the data is recovered.

Many different types of communication systems have been developed and are regularly utilized to effectuate the communication of data between sending and receiving stations. And, as advancements in communication technologies permit, new types of communication systems, as well as improvements to existing communication systems, continue to be developed and utilized.

A radio communication system is a type of communication system in which the communication channel that interconnects the sending and receiving station is defined upon a radio link. A radio link forms a portion of the electromagnetic spectrum. Through the use of the radio link upon which to define the communication channel, the need otherwise to utilize a fixed-wireline connection is obviated. Radio communication systems, as a result, are less expensive to install due to reduced infrastructure costs. And, a radio communication system is amenable for implementation as a mobile communication system in which communication mobility is permitted.

Many, if not most, radio communication systems are bandwidth-constrained systems. That is to say, the portion of the electromagnetic spectrum allocated to a radio communication system is limited. The bandwidth constraint sometimes limits the communication capacity of the communication system. When the communication capacity of the communication system is constrained in this manner, the communication capacity of the system can be increased only through more efficient utilization of the allocated bandwidth.

Efforts are made, therefore, to more efficiently utilize the bandwidth allocated to the communication system. Through the use of digital communication techniques, significant communication capacity increases are possible. For instance, when data is digitized and formatted into data packets, the data can be communicated through the formation of packet-switched connections formed between the sending and receiving stations. A multiple increase in the communication capacity of the communication system is sometimes possible.

As increasingly data-intensive communication services are required to be effectuated, additional communication techniques have been proposed and, in some instances, implemented, further to increase the communication capacity of a digital communication system.

Recovery of the informational content of the data communicated in a radio communication system is sometimes complicated due to communication conditions on the radio channel upon which the data is communicated. Fading conditions exhibited upon the radio channel distort the values of the data so that the data, when received at the receiving station, differs in values with the values of the data when sent by the sending station. If compensation is not made for the distortion, the informational content of the data cannot properly be recovered.

One communication scheme whose objective is to facilitate effectuation of data-intensive communication services divides the available bandwidth into sub-bands. Data is communicated upon the separate sub-bands, and such data is modulated independently. The sub-bands, conventionally, are selected to be of frequency ranges small enough so that only marginal inter symbol interference (ISI) is exhibited, as the symbol periods are relatively lengthy. Such schemes are generally referred to as being FDM (Frequency Division Multiplexing) schemes. Conventionally, the sub-bands are separated in frequency by guard bands. Filters of large order are used to separate the sub-bands in the frequency domain.

If the guard bands are eliminated, additional spectrum is available for communication purposes. However, data communicated upon the overlapping sub-bands interfere with each other.

A particular type of frequency division multiplexing, referred to as OFDM (Orthogonal Frequency Division Multiplexing), is a technique in which the sub-bands are orthogonally related to one another. That is to say, OFDM is a technique in which frequency domain samples are placed so that sub-bands are orthogonal.

Conventionally, a sending station of an OFDM system utilizes an IFFT (Inverse Fast Fourier Transformer). And, a receiving station of the OFDM system utilizes an FFT (Fast Fourier Transformer). The orthogonality requirement of an OFDM system makes the OFDM communication scheme vulnerable to frequency offset, a problem regularly occurring at the receiving station. Additionally, when an OFDM system is utilized in a mobile environment in which at least one of the sending or receiving stations involved in the communication of the data is moving Doppler shifting aggravates the frequency offset. As relative speeds increase, Doppler shifting correspondingly increases, and the corresponding frequency offsets are, correspondingly, potentially even larger. Frequency offsets between the sending and receiving stations prevent accurate operation of the demodulator, e.g., the IFFT, and recovery of the informational content of the communicated data is ineffectively performed.

Existing OFDM systems assume constant channel conditions during data transmission. That is to say, the sub-bands upon which the data is communicated are presumed to be time-invariant, i.e., free of fading conditions and Doppler shifting. Actual communication conditions are, however, sometimes quite different.

If a manner could be provided by which to utilize an FDM (Frequency Division Multiplexing) communications while not requiring the use of guard bands and also better taking into account the actual communication conditions on the sub-bands upon which the data is communicated, improvements in communications would result.

It is in light of this background information related to FDM communication schemes that the significant improvements of the present invention have evolved.

SUMMARY OF THE INVENTION

The present invention, accordingly, advantageously provides apparatus, and an associated method, by which to communicate data in a communication system that exhibits time-varying communication conditions, such as fading conditions.

Through operation of an embodiment of the present invention, a manner is provided by which to facilitate communications in the communication of data through the use of FDM (Frequency Division Multiplexing) in which the effects of fading, or other time-variant conditions, are mitigated.

Cellular, as well as other mobile, communications effectuated in moving vehicles are able to be of improved quality levels.

Also through operation of an embodiment of the present invention, frequency sub-bands are utilized that partially overlap in frequency. The need for guard bands, otherwise necessitated in conventional OFDM communication schemes, is obviated.

Data parts of data that is to be communicated to effectuate a communication service are communicated on different ones of the frequency sub-bands and detected, in the time domain, at a receiving station. Time-domain channel tracking is utilized, permitting time-varying channel tracking to be performed.

In one aspect of the present invention, data parts are communicated upon adjacent ones of the partially overlapping sub-bands. When received at a receiving station, the energy detected on a particular sub-band includes both desired signal energy as well as interfering signal energy of data parts communicated upon adjacent sub-bands, together with thermal energy. Through appropriate processing at the receiving station, the signal energy of the interfering sub-band is removed, thereby to facilitate further processing of the desired signal energy. And, because the signal processing removes the signal energy of the undesired data parts of the signal energy at the sub-band, orthogonality of the desired signal energy relative to signal energy detected at other sub-bands is provided.

In another aspect of the present invention, for each sub-band, over sampling is performed upon the signal energy, in manners that cause temporal whitening of the signal energy. The signal whitening creates the existence of an out-of-band frequency range of the interfering energy. And, once shifted, band pass filtering is performed to remove the interfering signal energy.

In another aspect of the present invention, the data communicated upon the separate sub-bands is formatted into formatted parts, such as packets, that include training or pilot symbols. The training or pilot symbols form known, transmitted values, the appropriate as-sent values of which are known at the receiving station.

In another aspect of the present invention, receiving-station apparatus, including a pre-filter for operating upon the sub-bands upon which data parts are communicated. The pre-filter is formed of an anti causal FIR (Finite Impulse Response) filter that performs temporal whitening of the signal energy applied thereto at each of the separate sub-bands. The pre-filter also includes an interference rejection filter that exhibits pass bands that pass energy components within the sub-band while rejecting energy components that are shifted by the anti causal filter to be beyond the pass band of the filters. The interference rejection filter forms a causal filter, and the filtered signal passed by the interference rejection filter, at each sub-band, is of the desired signal energy, free of interfering signal components, at each of the sub-bands. Subsequent frequency translation to zero-shift the signal energy at each of the different sub-bands by the prefilter permits subsequent operations to be performed upon the signal energy at the different sub-bands.

In one implementation, a cellular communication system is constructed to be operable pursuant to an overlapping frequency domain multiplexing with interference rejection (NSOFDM) communication scheme. Sub-bands are defined upon which to modulate data parts of data that is to be communicated to effectuate a communication service. The sub-bands are defined such that adjacent ones of the sub-bands overlap in frequency with one another. The data parts are communicated upon the separate sub-bands to a receiving station. The receiving station detects the signal energy at the various sub-bands. And, a pre-filter, located at the receiving station, performs temporal whitening of the signal energy at each of the sub-bands. And, once the temporal whitening is performed, band pass filtering is performed to reject interfering signal energy components at each of the sub-bands. Frequency, i.e., frequency translation to a zero-shift offset, is performed. And, thereafter, additional processing is performed upon the signal components at the various sub-bands, orthogonal to one another, to recreate the informational content of the transmitted data.

In these and other aspects, therefore, apparatus, and an associated method, is provided for a communication system in which data is communicated through a receiving station on a communication link susceptible to distortion. Recovery of the data, communicated pursuant to a frequency division multiplexing scheme, is facilitated. The data is communicated as a first data-part upon a first sub-band and at least a second data-part communicated upon at least a second sub-band. Adjacent ones of the first and at least second sub-bands partially overlap in frequency. A data-part isolating filter is coupled to receive indications of values of the data, once received at the receiving station. The data-part isolating filter forms separate filtered values within frequency ranges defining each of the first and at least second sub-bands, respectively. A pre-filter sampler is coupled to receive the separate filtered values formed by the data-part isolating filter for each of the first and at least second sub-bands. The pre-filter sampler samples the separate filtered values applied thereto at sampling rates causing frequency-shifting of selected portions of each of the separate filtered values to out-of-bound frequency ranges. A pre-filter rejection filter is coupled to the pre-filter sampler. The pre-filter sampler rejects the selected portions of each of the separate filtered values frequency-shifted by the pre-filter sampler and performing therefrom filtered representations of each of the first and at least second data parts.

A more complete appreciation of the present invention and the scope thereof can be obtained from the accompanying drawings that are briefly summarized below. The following detailed description of the presently-preferred embodiments of the invention, and the appended claims.

DETAILED DESCRIPTION

Figure 1:
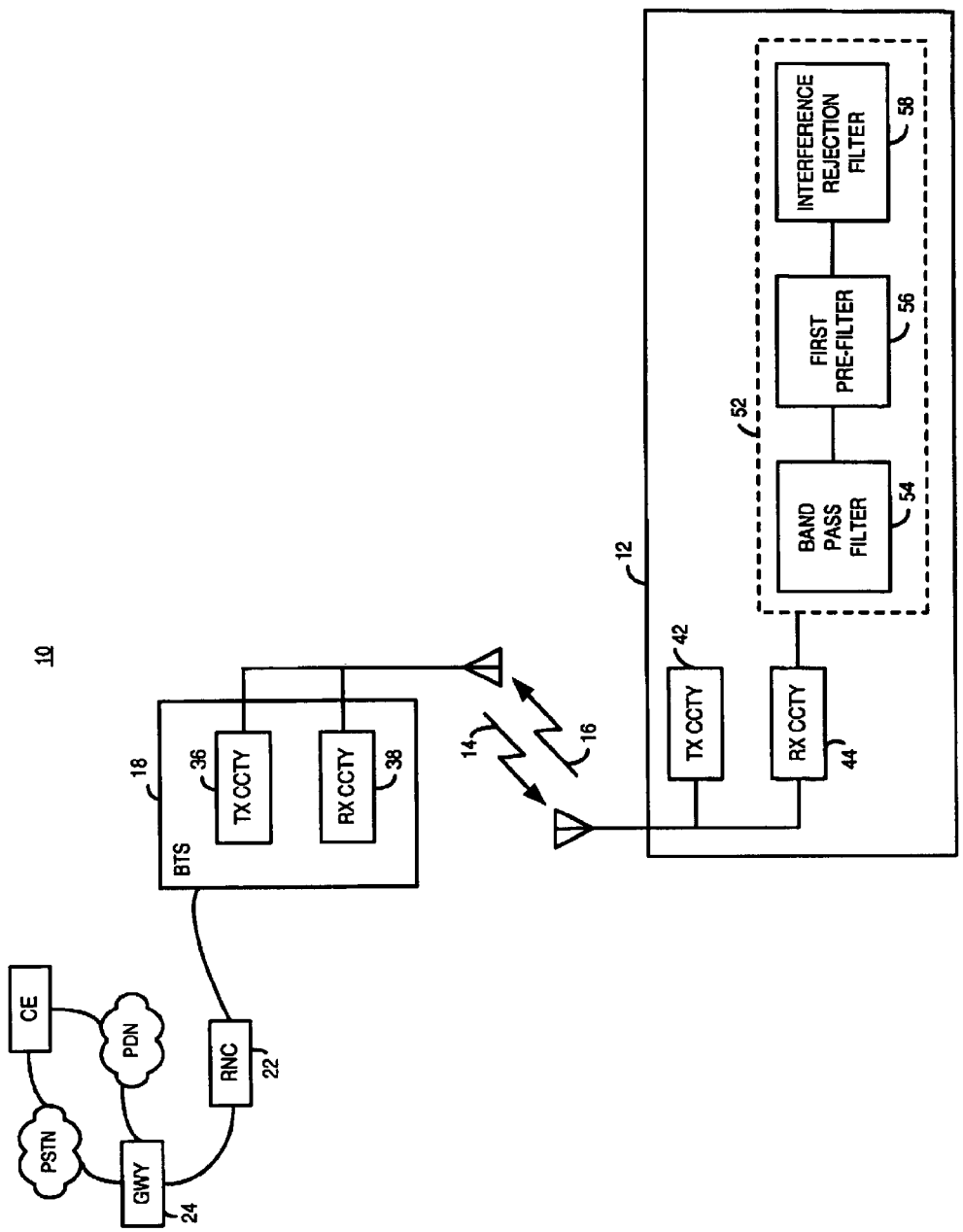
FIG. 1 illustrates a functional block diagram of a radio communication system in which an embodiment of the present invention is embodied.

Referring first to FIG. 1, a radio communication system, shown generally at 10, provides for radio communications with a mobile station 12. In the exemplary implementation, the communication system forms a cellular communication system operable, in general, to any selected digital cellular standard. For instance, the communication system 10 is representative of a GSM (General System for Mobile Communications), such as a GSM system that provides for GPRS (General Packet Radio Service) or EDGE (Enhanced Data for GSM Evolution), each of which provides for data communications. The communication system is also representative of other types of cellular communication systems, such as a CDMA 2000 (Code-Division, Multiple-Access 2000) communication scheme. And, more generally, the communication system 10 is representative of many of various mobile communication systems in which data is communicated upon communication channels susceptible to distortion, caused, for instance, by fading conditions.

Accordingly, while the following description shall describe operation of an embodiment of the present invention with respect to its implementation in a cellular communication system that provides for data communications, the present invention is analogously also operable in other types of mobile communication systems.

The mobile station 12 communicates by way of radio links with a network part of the communication system The radio links are represented here by downlinks 14 and uplinks 16 to permit the effectuation of two-way communications with the mobile station.

The network part of the communication system includes a base station system (BSS) that includes a base transceiver station (BTS) 18. The base transceiver station of the base station system forms a radio transceiver. And, the circuitry of the mobile station also forms a radio transceiver. Each is capable of transducing radio signals therebetween by way of channels defined upon the downlink and the uplink, respectively.

The base transceiver station of the base station system forms part of a radio access network part of the communication system. And, the radio access network part of the communication system is here further shown to include a radio network controller (RNC) 22. The radio network controller is coupled between the base station system and a radio gateway (GWY) 24. The gateway forms a gateway with other parts of the communication system, here represented by a packet data network (PDN) 28 and a public-switched telephonic network (PSTN) 32. A correspondent entity (CE) is coupled to the networks 28 and 32 and is representative of a data source, such as a data server, connectible to a packet data network formed of the internet.

The base transceiver station 18 of the base station system includes transmit circuitry 36 and receive circuitry 38 operable to form and transmit data that is to be communicated to the mobile station and to detect, and to operate upon, uplink signals generated by the mobile station and transmitted to the network part of the communication system.

Analogously, the mobile station also includes transmit and receive circuitry, here identified at 42 and 44, respectively. The transmit circuitry 42 of the mobile station operates to generate and to transmit the uplink signals generated upon uplink channels defined upon the uplink 16.

An embodiment of the present invention facilitates communication of data during operation of the communication system through the use of NSOFDM. (Overlapping Frequency Domain Multiplexing with interference rejection) communication techniques. Through use of the NSOFDM technique, guard bands, used in conventional OFDM techniques are obviated. And, the communication channels upon which the data is communicated is not assumed to be time-invariant, but rather, channel tracking can be utilized, thereby to mitigate the effects of fast-fading conditions. Improved quality of communications is possible as fading conditions, or other time-variant channel conditions, can be taken into account when a receiving station operates to recover the informational content of data communicated thereto.

For purposes of explaining operation of an exemplary embodiment of the present invention, communication of data originated at the network part of the communication system for communication to the mobile station to effectuate a communication service therewith shall be described. In the exemplary implementation, however, the transmit circuitry 36 and 42 both operate analogously as does, correspondingly, the receive circuitry 38 and 44.

At the transmit circuitry 36, data that is to be communicated therefrom is divided into data parts. And, sub-bands are defined upon which to communicate the separate data parts into which the data is divided. The sub-bands are selected to be of frequencies such that adjacent ones of the sub-bands overlap with one another in frequency. No guard bands are assigned to separate the sub-bands, in contrast to conventional OFDM techniques. And, the transceiver circuitry causes the data parts to be communicated upon the separate sub-bands defined upon the forward link 14, to the mobile station 12. The mobile station 12 includes apparatus 52 of an embodiment of the present invention by which to operate upon the receive data, detected upon the separate sub-bands. The apparatus 52 operates, for each sub-band, to remove interfering components, i.e., signal components of the adjacent sub-bands. By doing so, orthogonality is introduced between the data received at the separate sub-bands. By introducing the orthogonality, FFT (Fast Fourier Transform) techniques, used in OFDM, can be utilized. Thereby, the detection complexity of operation at the receive circuitry corresponds to the detection complexity of conventional OFDM techniques.

The apparatus 52 is here shown to include a band pass filter 54 coupled to receive indications of the data received on the separate sub-bands. The band pass filter 54 operates to form separate filtered components for each of the separate sub-bands. Once filtered, the data, detected on each sub-band, is provided to a first pre-filter 56 that performs temporal whitening operations. And, once temporal whitening is performed, the data, on each sub-band, is provided to an interference rejection filter 58. The interference rejection filter operates to reject interfering components, i.e., signal energy generated upon the overlapping sub-bands.

Figure 2:
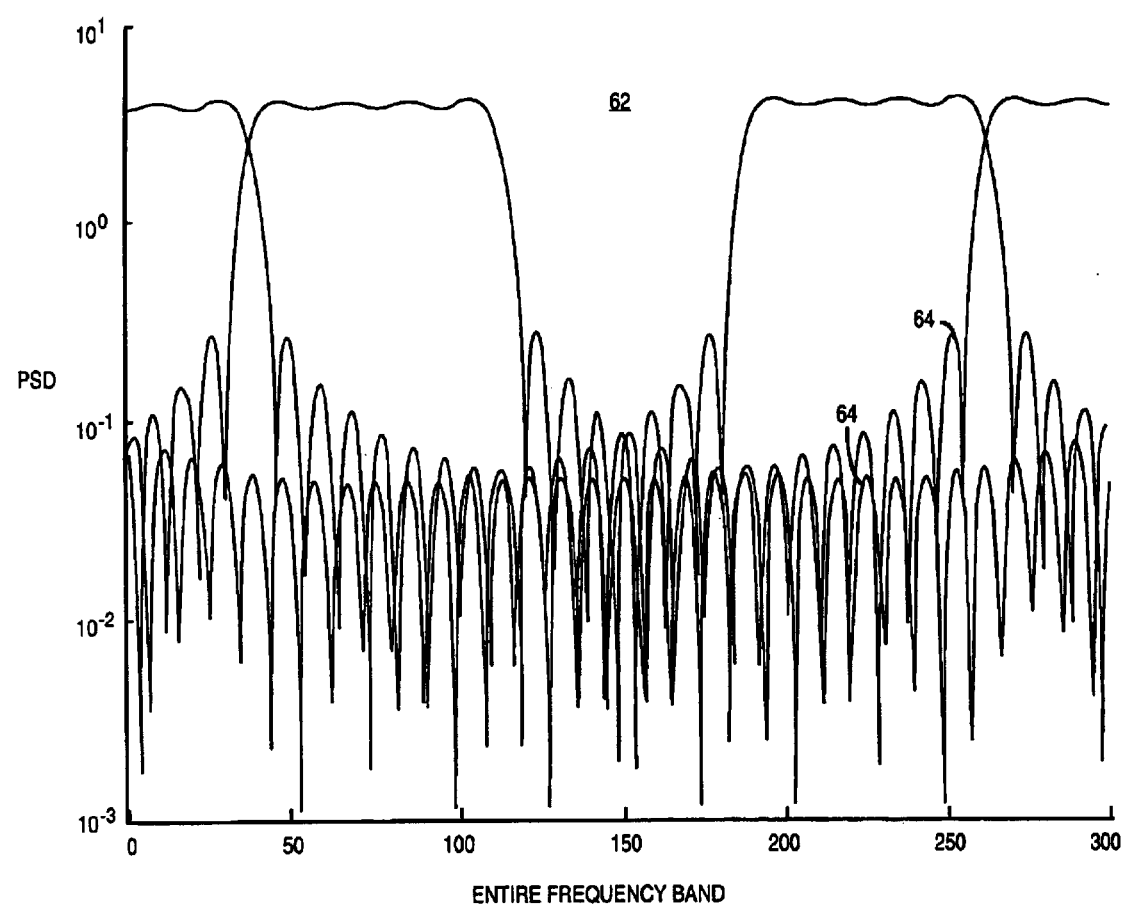
FIG. 2 illustrates a graphical representation of exemplary signal energy of signals generated upon various sub-bands during operation of the communication system shown in FIG. 1.

FIG. 2 illustrates a graphical representation of the signal energy, shown generally at 62, of the data parts, communicated upon the separate sub-bands defined upon which to communicate the data parts of the data to be communicated to effectuate the communication service. Signal energy, designated at 64, at different ones of the sub-bands is representative of the signal energy of the data communicated upon the separate sub-bands.

Figure 3:
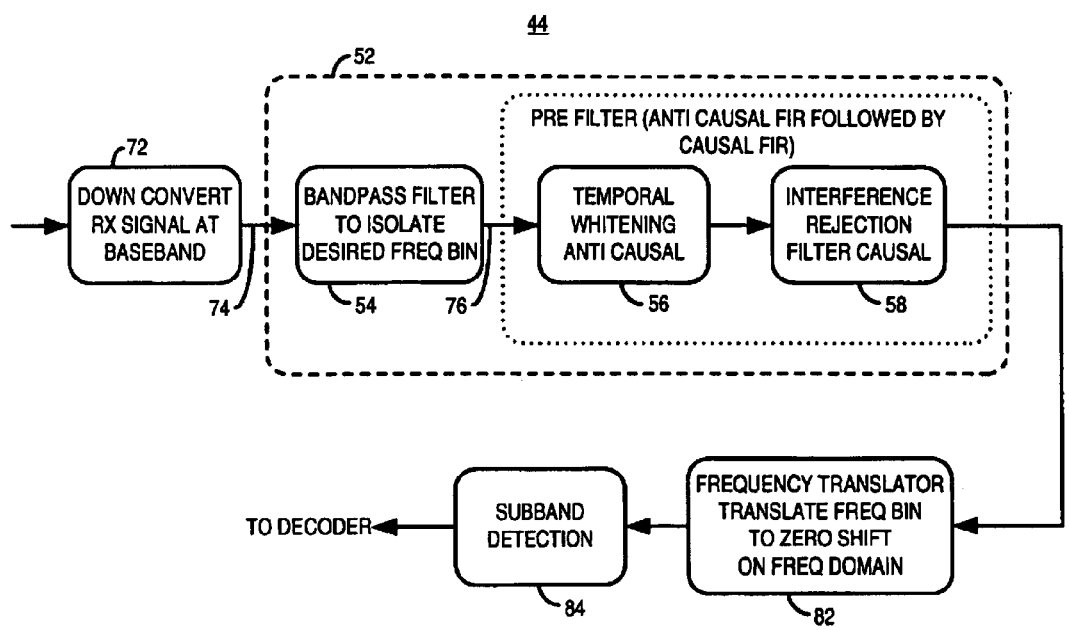
FIG. 3 illustrates a functional block diagram representative of portions of the communication system shown in FIG. 1.

FIG. 3 illustrates portions of the receive circuitry 44 forming part of the mobile station of the communication system 10 shown in FIG. 1. Here, the receive circuitry is again shown to include the apparatus 52 of an embodiment of the present invention. First, and as indicated by the block 72, down conversion of the signal energy of the received data is performed to a base band level. And, signal energy formed on the line 74 and applied to the band pass filter 54 is of a base band level. The base band signal contains a linear combination of several narrow band frequency bins that are modulated independently, and overlap in the frequency domain. The band pass filter operates to isolate each of the sub-bands. And, first-filtered signals are generated on the line 76 and applied to the filter 56. The filter 56 separates the desired signal energy component at each sub-band and the signal energy of the overlapping sub-bands. And, then, the signal components are applied to the filter 58 at which the interfering component parts are rejected. Thereafter, the past component parts are applied to a frequency translator 82 that operates to translate the frequency bins to zero-shift frequency offsets in the frequency domain. Thereafter, and as indicated by the block 84, sub-band detection is performed, here through the use of a fast Fourier transformer.

The choice of the frequency width of a sub-band is traded-off with a competing need to detect each sub-band independently. A sub-band of small enough frequency width to yield a single-tap IR (impulse response) per sub-band, so that MAP detection can be performed with trivial complexity.

Figure 4:
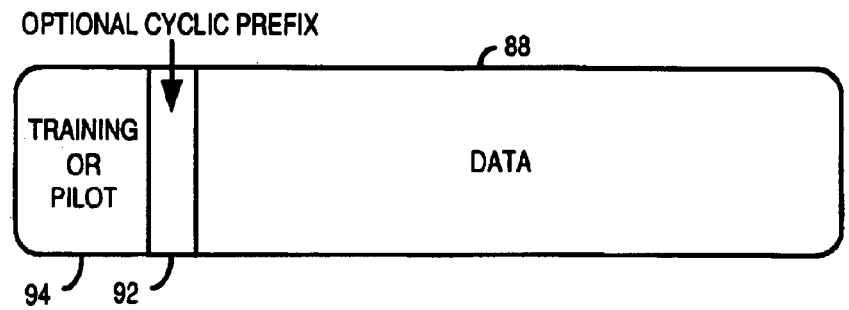
FIG. 4 illustrates the format of an exemplary data burst generated during operation of the communication system shown in FIG. 1.

FIG. 4 illustrates an exemplary data burst, represented generally at 86, here shown to be formed of a data portion 88, a cyclic prefix portion 92, and training or pilot symbols 94.

Figure 5:
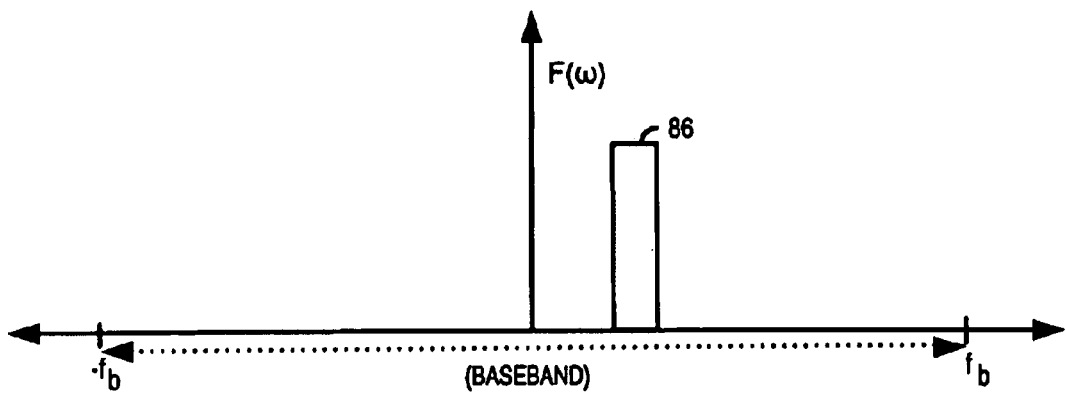
FIG. 5 illustrates a representation, in the frequency domain, of the data burst shown in FIG. 4.

FIG. 5 illustrates the same base band burst, here plotted in the frequency domain, rather than the time domain. The base band burst is again identified at 86.

At each sub-band, the signal energy is formed of the desired data part, thermal noise, and adjacent-sub channel interfering components. That is to say, the total interference at a particular sub-band includes the super position of the two adjacent sub-channel interfering components as well as thermal noise. The length of the burst is selected to be short enough so that, a typical Doppler frequencies likely to be encountered, the impulse response (IR) can be tracked over the burst.

The data symbols of the data that is communicated upon the sub-bands are formed of data symbols that are, in turn, formed of coded data bits. The coded data bits are interleaved. And, the interleaving is performed in either the frequency domain, as in OFDM, or in the time domain. Interleaved in either domain, the coded and interleaved bits are formed into MQAM symbols that form the data part of each sub-band burst. For each sub-band, a model, based on sufficient statistics and sampling at a rate used for the entire base band, represents an over-sampled model, represented by:

$$y[k] = \sum_{m=0}^{M} h[m]d[k-m] + n_s[k]$$

Wherein:

k denotes a discrete time;

[y] [k] denotes the received symbols; and d[k] denotes unknown transmitted symbols.

The impulse response h[k] for each of the sub-bands is estimated from the pilot symbols 94 as is also the interference, $n_s[k]$ over the training symbols.

The existence of an anti-causal, feed-forward filter 56 that accomplishes both temporal whitening and a diagonally dominated effective IR matrix. MMSE synthesis is utilized to find the optimal coefficient f[ ] of the anti-causal FIR filter. A Hermitian form is presented that yields the filter co-efficients f[ ] and the optimal channel impulse response jointly. First, the following is represented:

$$\hat{d}[k] = f^T y - b^T d$$

Wherein, the bold lower case characters designate column vectors, and superscripts T designates a transpose. Here, for the synthesis of the FIR coefficients, d[k] designates known transmitted pilot or training symbols, and y[k] designates received symbols. Note that b operates on past detected symbols only. Two-new vectors are defined:

$$w = \{f[0]f[1]f[2] \ldots -b[1]-b[2]-b[3]\}^T$$

$$s = \{y[k]y[k+1]y[k+2] \ldots d[k-1]d[k-2]d[k-3]\}^T$$

And, in compact form, the following is represented:

$$w^T s = \hat{d}[k].$$

The instantaneous error is defined as follows:

$$e[k] = \hat{d}[k] - d[k] = w^T s - d[k]$$

And, the MMSC is:

$$\min \|w^T s - d[k]\|^2$$

This implies that:

$$E\{ss^+\}w^* = E\{d[k]^*s\}$$

Wherein * indicates the complex conjugate and + indicates a Hermitian transpose. Note that E[ss superscript plus]

is a Hermitian matrix, and the solution yields both the feed-forward and feedback coefficients jointly. Hermitian matrices arise in many situations in which the statistical properties of noise are stationary in time. Thereby, w can be solved for through a combination of equations 8 and 1 above.

The whitening process converts energy from the interference part of the spectrum to the out-of-band frequency range where the noise energy is increased. Over sampling creates the existence of the out-of-band frequency range. Such actions are performed by the filter 56. Then, the energy contained in the out-of-band frequency range is rejected. Thereby, in the time domain, interference energy is reduced. And, by decimating back to the Nyquist rate, detection is performed, in conventional manner, at the normal sub-band sampling rates, in the time domain.

Figure 6:
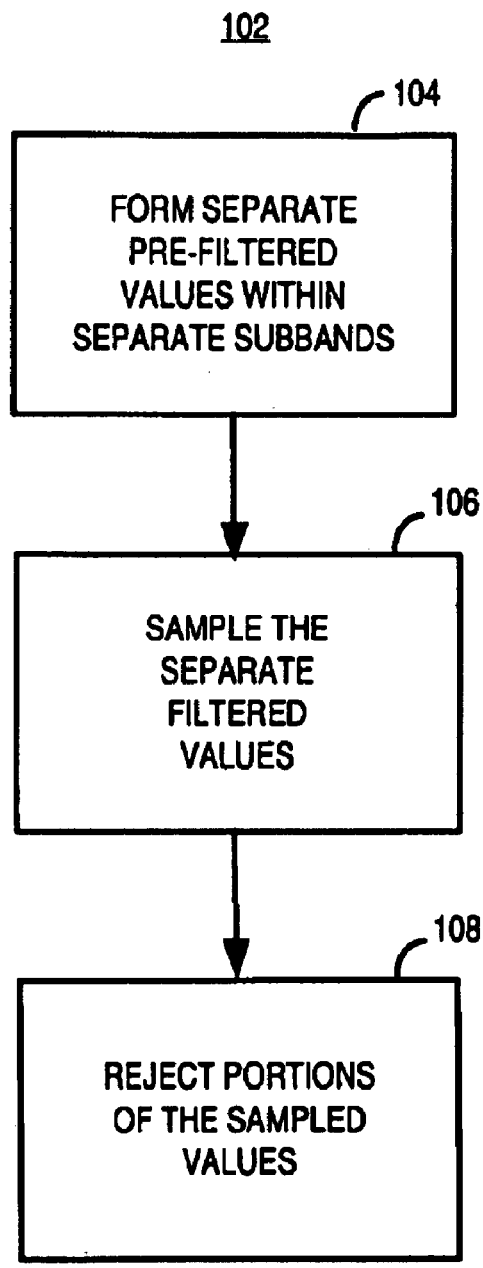
FIG. 6 illustrates a method flow diagram listing the method of operation of an embodiment of the present invention.

FIG. 6 illustrates a method flow diagram, shown generally at 102, of an embodiment of the present invention. The method facilitates recovery of data communicated upon a communication link susceptible to distortion. The data is communicated pursuant to a frequency division multiplexing scheme as a first data part communicated upon a first sub-band and at least a second data-part communicated upon at least a second sub-band. Adjacent ones of the first and at least second sub-bands partially overlap in frequency.

First, and as indicated by the block 104, separate filtered values are formed within frequency ranges defining each of the first and at least second sub-bands. Then, and as indicated by the block 106, the separate filtered values are sampled at sampling rates causing frequency-shifting of selected portions of each of the separate filtered values at sampling rates causing frequency-shifting of the selected portions of each of the separate filtered values to out-of-bound frequency ranges.

Then, and as indicated by the block 108, the selected portions of the separate filtered values of frequency-shifted to the out-of-bound frequency ranges are rejected, thereby forming filtered representations of each of the first and at least second data-parts.

The previous descriptions are of preferred examples for implementing the invention, and the scope of the invention should not necessarily be limited by this description. The scope of the present invention is defined by the following claims:

We claim:

1. Apparatus for a communication system in which data is communicated to a receiving station on a communication link susceptible to distortion, said apparatus for facilitating recovery of the data, communicated pursuant to a frequency division multiplexing scheme as a first data part communicated upon a first sub-band and at least a second data-part communicated upon at least a second sub-band, adjacent ones of the first and at least second sub-bands partially overlapping in frequency, said apparatus comprising:

a data-part isolating a filter coupled to receive indications of values of the data, once received at the receiving station, said data-part isolating filter for forming separate filtered values within frequency ranges defining each of the first and at least second sub-bands, respectively;

a pre-filter sample coupled to receive the separate filtered values formed by said data-part isolating filter for each of the first and at least second sub-bands, said pre-filter sampler for sampling the separate filtered values applied thereto at sampling rates causing frequency-shifting of selected portions of each of the separate filtered values to out-of-bound frequency ranges; and a pre-filter rejection filter coupled to said pre-filter sampler, said pre-filter rejection filter for rejecting the selected portions of each of the separate filtered values frequency-shifted by said pre-filter sampler and for forming therefrom filtered representations of each of the first and at least second data-parts.

2. The apparatus of claim 1 wherein the separate filtered values formed by said data-part isolating filter are each formed of an intended sub-band component and interfering, adjacent sub-band components.

3. The apparatus of claim 1 wherein data-parts communicated upon each of the first and at least second sub-bands is formatted into a data-portion and training-portion and wherein said apparatus further comprises an Impulse Response (IR) estimator, said Impulse Response estimator for estimating an Impulse Response of the communication link responsive to values of the training-portion of the data parts.

4. The apparatus of claim 3 wherein said Impulse Response (IR) estimator estimates a separate impulse response for each of the first and at least second sub-bands.

5. The apparatus of claim 4 wherein said pre-filter sampler comprises an anti-causal filter.

6. The apparatus of claim 4 wherein said pre-filter sampler comprises a Finite Impulse Response (FIR) filter.

7. The apparatus of claim 4 wherein said pre-filter sampler performs temporal whitening of the indications of the values of the data applied thereto.

8. The apparatus of claim 1 wherein said pre-filter rejection filter comprises a Finite Impulse Response (FIR) filter.

9. The apparatus of claim 1 wherein said pre-filter rejection filter comprises a causal filter.

10. The apparatus of claim 1 wherein said pre-filter rejection filter comprises a passband filter exhibiting passbands at each of the first and at least second sub-bands.

11. The apparatus of claim 1 wherein said pre-filter sampler utilizes Maximum Sequence Estimation (MSE) to determine filter coefficients determinative of operation thereof to cause the frequency-shifting of the selected portions of each of the separate filtered values.

12. The apparatus of claim 1 wherein the communication system comprises a radio communication system, wherein the communication link comprises a radio link, wherein the distortion comprises fading, and wherein the filtered representations of each of the first and at least second data-pats are substantially orthogonal to one another.

13. The apparatus of claim 1 further comprising a frequency translator coupled to receive the filtered representations of each of the first and at least second data-parts, said frequency translator for translating the filtered representations to selected frequency-offsets.

14. The apparatus of claim 1 further comprising a Fourier Transformer coupled to receive indications of the filtered representations formed by said pre-filter rejection filter, said Fourier Transformer for transforming the indications of the representations of the representations between a frequency domain and a time domain.

15. A method for communicating in a communication system in which data is communicated to a receiving station on a communication link susceptible to distortion, said method for facilitating recovery of the data, communicated pursuant to a frequency division multiplexing scheme as a first data part communicated pursuant to a frequency division multiplexing scheme as a first data-part communicated upon a first sub-band and at least a second data-part communicated upon at least a second sub-band, adjacent ones of the first and at least second sub-bands partially overlapping in frequency, said method comprising the operations of:

forming, responsive to indications of values of the data once received at the receiving station, separate filtered values within frequency ranges defining each of the first and at least second sub-bands respectively;

sampling the separate filtered values applied thereto at sampling rates causing frequency-shifting of selected portions of each of the separate filtered values applied thereto at sampling rates causing frequency-shifting of selected portions of each of the separate filtered values to out-of-bound frequency ranges; and rejecting the selected portions of each of the separate filtered values of the frequency-shifted to the out-of-bound frequency ranges, thereby forming filtered representations of each of the first and at least second data-parts.

16. The method of claim 15 further comprising an operation, prior to said operation of forming, of:

modulating the data into the first part and at least the second part at frequencies, respectively, at the first sub-band and at least at the second sub-band, that partially overlap theretogether; and sending the first and at least second data parts upon the communication link to the receiving station.

17. The method of claim 16 wherein the first and at least second data parts are formatted into data-portions and training-portions.

18. The method of claim 17 further comprising the operation of estimating an Impulse Response of the communication link.

19. The method of claim 15 wherein said operation of sampling temporally whitens the indications of the values of the data.

20. The method of claim 19 further comprising the operation of performing maximum sequence estimation to determine operational parameters by which to carry out said operation of sampling.

* * * * *